(12) United States Patent
Munir et al.

(10) Patent No.: US 9,045,239 B2
(45) Date of Patent: Jun. 2, 2015

(54) SPACECRAFT PAYLOAD ORIENTATION STEERING

(75) Inventors: Saghir Munir, Union City, CA (US);
Xen Price, Redwood City, CA (US);
Matthew Machlis, Burlingame, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 1308 days.

(21) Appl. No.: 12/629,707

(22) Filed: Dec. 2, 2009

(65) Prior Publication Data

US 2010/0179711 A1 Jul. 15, 2010

Related U.S. Application Data

(60) Provisional application No. 61/144,526, filed on Jan. 14, 2009.

(51) Int. Cl.
*B64G 1/24* (2006.01)

(52) U.S. Cl.
CPC . *B64G 1/24* (2013.01); *B64G 1/242* (2013.01)

(58) Field of Classification Search
USPC ............... 244/158.4, 158.6, 171.1, 171.2
See application file for complete search history.

(56) References Cited

U.S. PATENT DOCUMENTS

| | | | | |
|---|---|---|---|---|
| 3,836,969 A * | 9/1974 | Bond et al. | ...................... | 342/356 |
| 4,776,540 A * | 10/1988 | Westerlund | ................... | 244/164 |
| 4,911,385 A * | 3/1990 | Agrawal et al. | ............... | 244/165 |
| 5,100,084 A * | 3/1992 | Rahn et al. | ..................... | 244/165 |
| 5,184,790 A * | 2/1993 | Fowell | .......................... | 244/165 |
| 6,135,389 A * | 10/2000 | Fowell | ........................ | 244/158.4 |
| 6,223,019 B1 | 4/2001 | Briskman et al. | | |
| 6,327,523 B2 * | 12/2001 | Cellier | .......................... | 701/13 |
| 6,389,336 B2 * | 5/2002 | Cellier | .......................... | 701/13 |
| 6,695,262 B2 * | 2/2004 | Wang et al. | ................... | 244/164 |
| 7,369,809 B1 * | 5/2008 | Wang | .......................... | 455/12.1 |
| 7,665,695 B2 * | 2/2010 | Wang et al. | ................... | 244/164 |
| 8,265,549 B2 * | 9/2012 | Karabinis et al. | ............ | 455/12.1 |
| 2007/0228218 A1 | 10/2007 | Brumfield et al. | | |

* cited by examiner

*Primary Examiner* — Joseph W Sanderson
*Assistant Examiner* — Keith L Dixon
(74) *Attorney, Agent, or Firm* — Weaver Austin Villeneuve & Sampson LLP

(57) ABSTRACT

Spacecraft payload orientation steering is provided for an orbiting spacecraft in motion along an orbit track around a celestial body, the orbit track having a nominal inclination with respect to an equatorial orbit, a substantial eccentricity, and a drift angle with respect to the nominal inclination. Coordinates of an optimal payload target location as a function of a spacecraft position along the orbit track are determined, the target location being on the surface of the celestial body and having a substantial motion with respect to the surface and with respect to a spacecraft nadir. A payload of the spacecraft is substantially aligned with the determined coordinates by steering the satellite body to correct for at least one of the inclination drift angle, and the eccentricity, thereby adjusting the spacecraft orientation as a function of the spacecraft position along the orbit track.

24 Claims, 9 Drawing Sheets

SPACECRAFT PAYLOAD ORIENTATION STEERING

RELATED APPLICATIONS

The present patent application claims the priority benefit of commonly owned U.S. provisional patent application 61/144,526, filed Jan. 14, 2009, entitled "Spacecraft Payload Orientation Steering", which is hereby incorporated by reference in its entirety into the present patent application.

TECHNICAL FIELD

This invention relates generally to spacecraft and, in particular, to methods and apparatus for orientation steering of a spacecraft such that optimal payload steering profiles are determined and achieved.

BACKGROUND OF THE INVENTION

The assignee of the present invention manufactures and deploys spacecraft for communications and broadcast services. Many such spacecraft operate in a geosynchronous orbit having a period equal to one sidereal day (approximately 23.93 hours).

A particular type of geosynchronous orbit is a geostationary orbit (GSO), characterized as being substantially circular and co-planar with the Earth's equator. A satellite in GSO is substantially stationary relative to any point on the earth's surface. Requirements for orienting such a spacecraft and provisions for recovering from a loss of desired pointing orientation are described in Brumfield et. al., US 2007/0228218 (hereinafter, Brumfield) which claims the priority benefit of U.S. 60/776,858. The disclosures of the foregoing related applications are hereby incorporated by reference in their entirety into the present application.

An elevation angle from a user located on the Earth to a satellite in GSO is a function of the user's latitude. When a service area on the ground intended to receive communications or broadcast services (hereinafter, an "intended service area") is at a relatively high latitude, the elevation angle is relatively small. At the latitudes of service areas containing many population centers of interest, for example in North America, Europe, and Asia, the elevation angle from the intended service area to the GSO spacecraft is small enough that service outages, for example from physical blockage, multipath fading, and foliage attenuation, are problematic.

To mitigate this problem, satellites operable in inclined, elliptical geosynchronous orbits have been proposed, as described, for example in Briskman, et al., U.S. Pat. No. 6,223,019, (hereinafter, Briskman) the disclosure of which is hereby incorporated in its entirety into the present patent application. A geosynchronous, highly inclined, elliptical orbit (HIEO) may be selected such that the orbit's apogee is located at a pre-selected, substantially constant, longitude and latitude. A satellite disposed in an HIEO can, during much of its orbital period (e.g., sixteen hours out of twenty four) enable higher elevation angles to a user than a GSO satellite.

A satellite disposed in an HIEO, however, has a substantial motion with respect to a user. This motion is illustrated in FIG. 1, which presents an exemplary "ground track" 101 of a spacecraft in a typical HIEO. Ground track 101 represents successive nadir points of the orbiting spacecraft as the spacecraft moves around an HIEO orbit track. In the example illustrated in FIG. 1, the spacecraft nadir crosses the equator at hour zero at approximately −68 degrees longitude, at which time, it is within view of a service area centered at approximately 40 degrees north latitude and −96 degrees longitude. During the next sixteen hours, the spacecraft nadir (i.e., ground track) remains within the northern hemisphere, reaching a maximum latitude at orbit apogee of about 55 degrees at a longitude of −96 degrees.

FIG. 1 illustrates that a satellite disposed in a HIEO may deliver communications or broadcast services to an intended service area for as much as sixteen hours centered about the orbit apogee (hereinafter, the "service period"). During the service period a 'look' angle (that may be conventionally described in terms of azimuth and elevation angle from a location in the intended service area to the spacecraft) varies considerably. At any moment during the service period, there exists an optimal spacecraft payload orientation that maximizes the equivalent isotropic radiated power (EIRP) from, for example, a transmit antenna to the intended service area. In other words, to optimize delivery of broadcast or communications services, a boresight of the antenna should be steered (relative to nadir pointing) so as to point the boresight at the coordinate location of an optimal target. Thereby, the EIRP over the intended service area may be continuously optimized during the service period.

The optimal target is, in general, not fixed with respect to the earth, the satellite, or the satellite nadir. Rather, the optimal target moves, for example, along "Z axis aim" track 102 which may be substantially different from ground track 101. As illustrated in FIG. 2, which presents region 'A' of FIG. 1 on an expanded scale, for an intended service area nominally centered at 39.5 degree north latitude and −96 degrees longitude, the optimal target may vary over a range between 35 and 40 degrees north latitude and between −91 and −101 degrees longitude.

The problem of payload pointing compensation for spacecraft in geosynchronous, near-geostationary orbit is discussed in Fowell, U.S. Pat. No. 6,135,389 (hereinafter, "Fowell"), the disclosure of which is hereby incorporated in its entirety into the present patent application. According to the techniques described in Fowell, deviations from a perfect geostationary orbit may be compensated by steering a satellite payload steered at a fixed virtual target below the Earth's surface. To the extent that a geosynchronous orbit is substantially inclined, this technique becomes inadequate. Even for minor inclinations, the technique described in Fowell fails to result in steering the satellite payload to track the coordinate location of the optimal target.

Payload pointing compensation for spacecraft in highly inclined elliptical orbits have been provided for in the prior art by means of offsets modeled by polynomial and Fourier series functions. In the prior art solutions, the polynomial and Fourier series function are parameterized only with respect to time and provide correction only for drift in an orbit's argument of latitude. Moreover, solutions provided by the prior art provide for steering of a spacecraft antenna reflector with respect to the spacecraft bus. See, for example, Briskman, et al., "S-DARS Broadcast from Inclined, Elliptical Orbits, IAF-01-M.5.04, $52^{nd}$ International Astronautical Congress, October 2001. Such steering can have a detrimental effect on payload optics, and may be impossible for certain large, unfurlable reflectors.

SUMMARY OF INVENTION

The present inventors have recognized that a payload orientation may be actively steered toward coordinates of an optimal payload target notwithstanding that these coordinates have a complex motion across the Earth's surface, and with respect to both the spacecraft and a spacecraft nadir. Advantageously, the desired payload orientation as a function of spacecraft location may be fitted with polynomial and Fourier series functions parameterized by outputs that may be obtained from an onboard orbit propagator processor. Such outputs, including the actual spacecraft longitude, latitude, radius and the argument of latitude, may be updated on a near-continuous basis by the onboard orbit propagator processor and take into account, for example, orbital drift. By linking an optimal EIRP-maximizing steering profiles to the onboard orbit propagator processor, the spacecraft may autonomously correct for orbital perturbations, notwithstanding substantial drift with respect to nominal orbital parameters such as inclination and eccentricity. Furthermore, optimized payload steering angles (or "profiles"), may be achieved by steering the entire spacecraft bus, rather than a payload antenna with respect to the bus.

The parameterized polynomial and Fourier series functions may thereby align a payload orientation steering profile very close to the theoretically optimal target coordinates at any instant of time (i.e., any position of the spacecraft along the orbit track). Thus, the antenna pattern may be continuously centered at the target coordinates which are substantially optimal with respect to the intended service area. Any change in the orbit due to drift or other disturbances is reflected in the output of the onboard orbit propagator processor. Since the payload pointing profile is driven by the output of the onboard orbit propagator processor, adjustments to the spacecraft orientation necessary to align the spacecraft with the determined coordinates may be made autonomously.

In an embodiment, optimal antenna EIRP is achieved and maintained by use of information already available in the on-board orbit propagator processor, such as a valid orbit and clock.

BRIEF DESCRIPTION OF THE DRAWINGS

Features of the invention are more fully disclosed in the following detailed description of the invention, reference being had to the accompanying drawings, in which.

Figure 1:
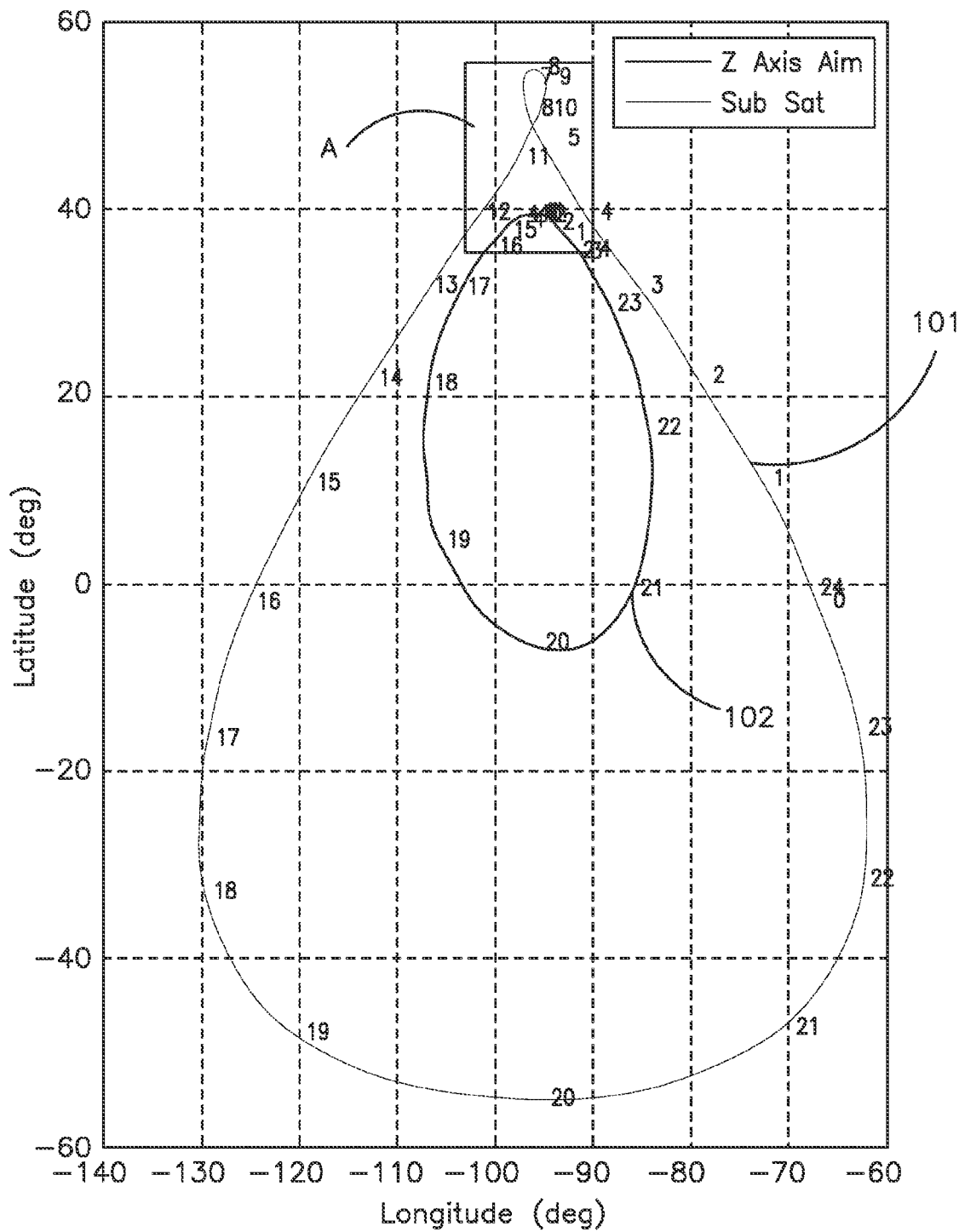
FIG. 1 illustrates a ground track and an optimal target aim point for a spacecraft in a geosynchronous HIEO.
Figure 2:
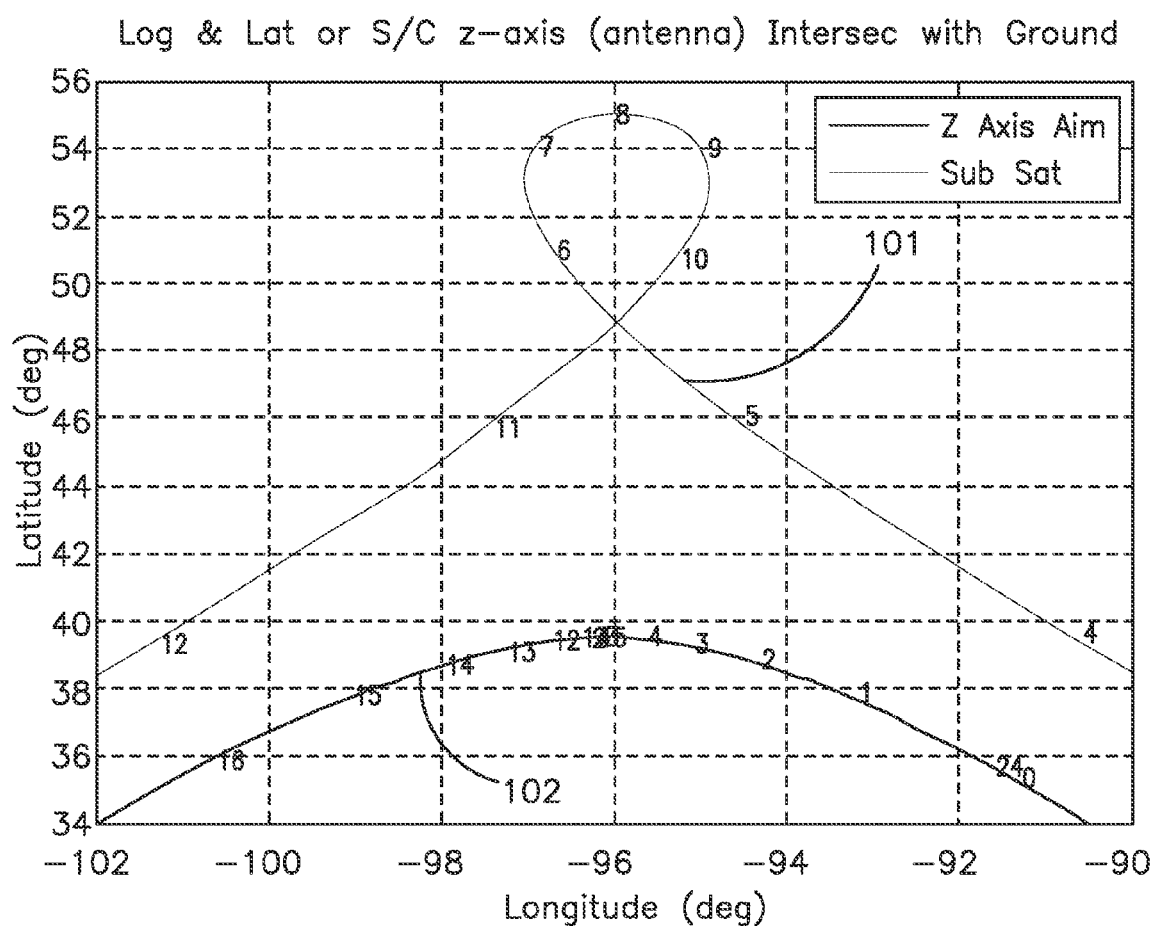
FIG. 2 illustrates, with an expanded scale, a portion of the ground track and payload aim point presented in FIG. 1.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. Furthermore, "connected" or "coupled" as used herein may include wirelessly connected or coupled. It will be understood that although the terms "first" and "second" are used herein to describe various elements, these elements should not be limited by these terms. These terms are used only to distinguish one element from another element. Thus, for example, a first user terminal could be termed a second user terminal, and similarly, a second user terminal may be termed a first user terminal without departing from the teachings of the present invention. As used herein, the term "and/or" includes any and all combinations of one or more of the associated listed items. The symbol "/" is also used as a shorthand notation for "and/or".

As summarized above, the presently disclosed techniques may be advantageously implemented in conjunction with a spacecraft operating in a non-geostationary earth orbit. In an exemplary embodiment, the spacecraft's orbit may be (a) substantially geosynchronous; (b) highly inclined with respect to the Earth's equator; and, (c) substantially non-circular (i.e., elliptical). Advantageously, the orbit's inclination and/or eccentricity may be permitted to "drift" over time due to various uncorrected orbital disturbances, thereby minimizing propellant expenditure and attitude disturbance torques associated with orbit correction maneuvers.

Figure 3A:
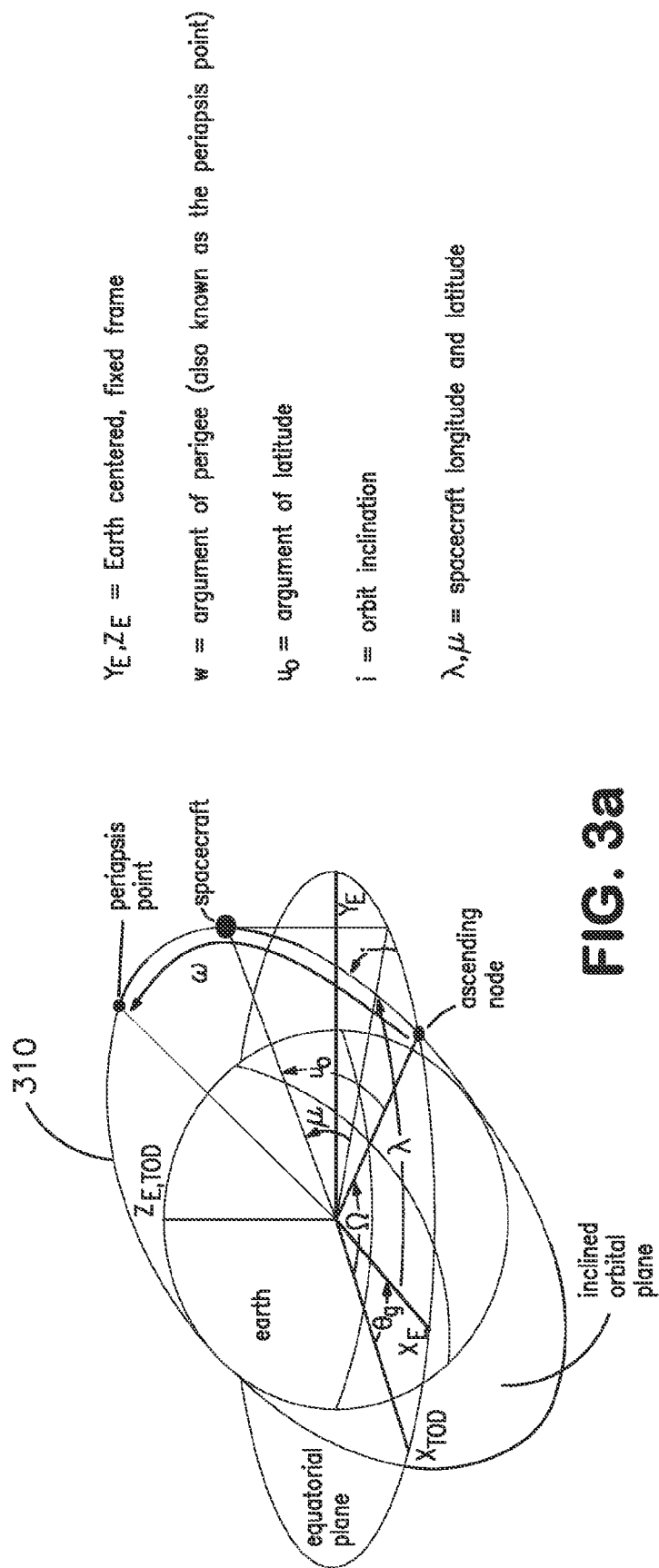
FIG. 3a illustrates an example of a highly inclined orbit and defines selected orbital parameters thereof.
Figure 3B:
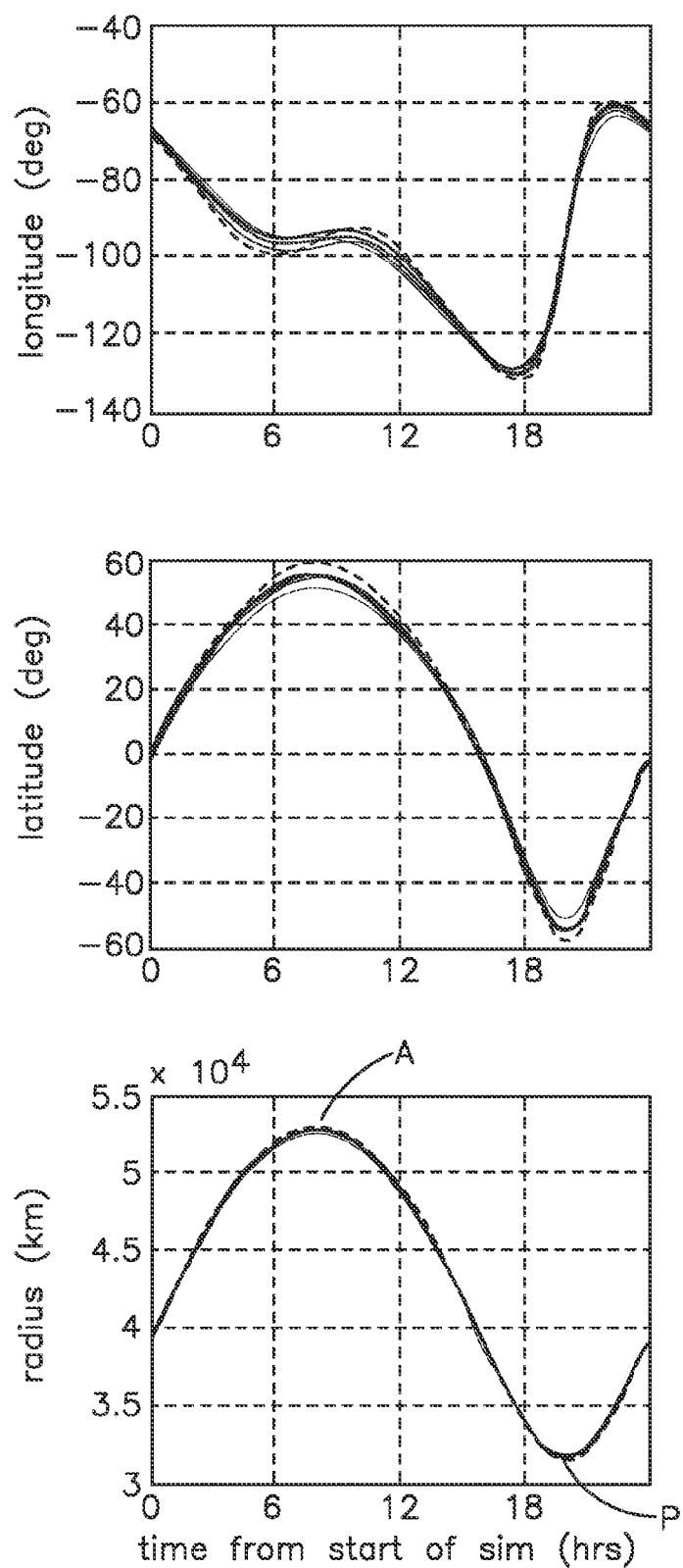
FIG. 3b illustrates spacecraft coordinates as a function of time for the example orbit.

FIG. 3a illustrates a typical highly inclined orbit and defines selected orbital parameters thereof. In an exemplary embodiment, the orbit track 310 may have an inclination 'i' of, for example, 55 degrees, an eccentricity of 0.25, an argument of perigee of 270 degrees, and an apogee longitude of −96 degrees. The spacecraft's instantaneous location along orbit track 310 may be denoted in terms of radius 'r' from the Earth's center, longitude $\lambda$, and latitude $\mu$. FIG. 3b presents plots of these parameters versus time for an exemplary HIEO orbit. It may be observed, for example that, in the exemplary orbit, apogee 'A' of about 53,000 km occurs at about hour eight, and perigee 'P' of about 32,000 km occurs at about hour twenty; the spacecraft is north of the Equator for approximately sixteen hours, during which time, the spacecraft longitude changes relatively slowly, particularly during the six hours centered at time of apogee.

Figure 4:
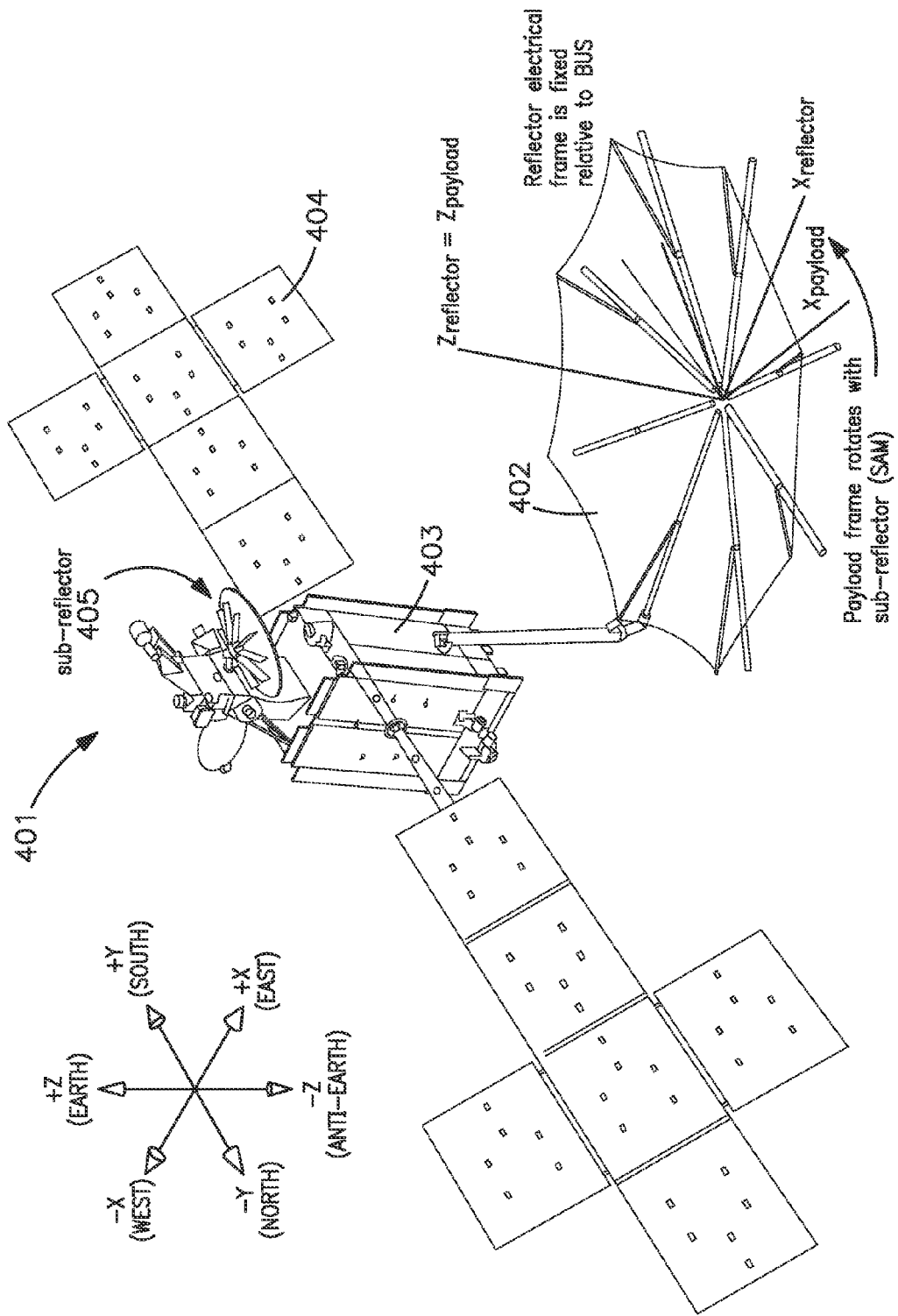
FIG. 4 illustrates an embodiment of a spacecraft.

Referring to FIG. 4, spacecraft 401 may deliver its payload service via a large, unfurlable reflector 402 that may not be amenable to being steered separately from spacecraft bus 403. In such embodiment, the vector along which a boresight of reflector 402 ($Z_{reflector}$) may be controlled by directly steering spacecraft bus 403 to which reflector 402 is attached. Thus, for optimal payload delivery, it may be advantageous to actively steer spacecraft bus 403 in order to keep $Z_{reflector}$ pointed at a desired optimal target, coordinates of which may vary with time as a function of a location of spacecraft 401 along orbit track 310. Active steering of spacecraft bus 403 to align $Z_{reflector}$ with the target coordinates is referred to herein as 'payload steering'.

Figure 6:
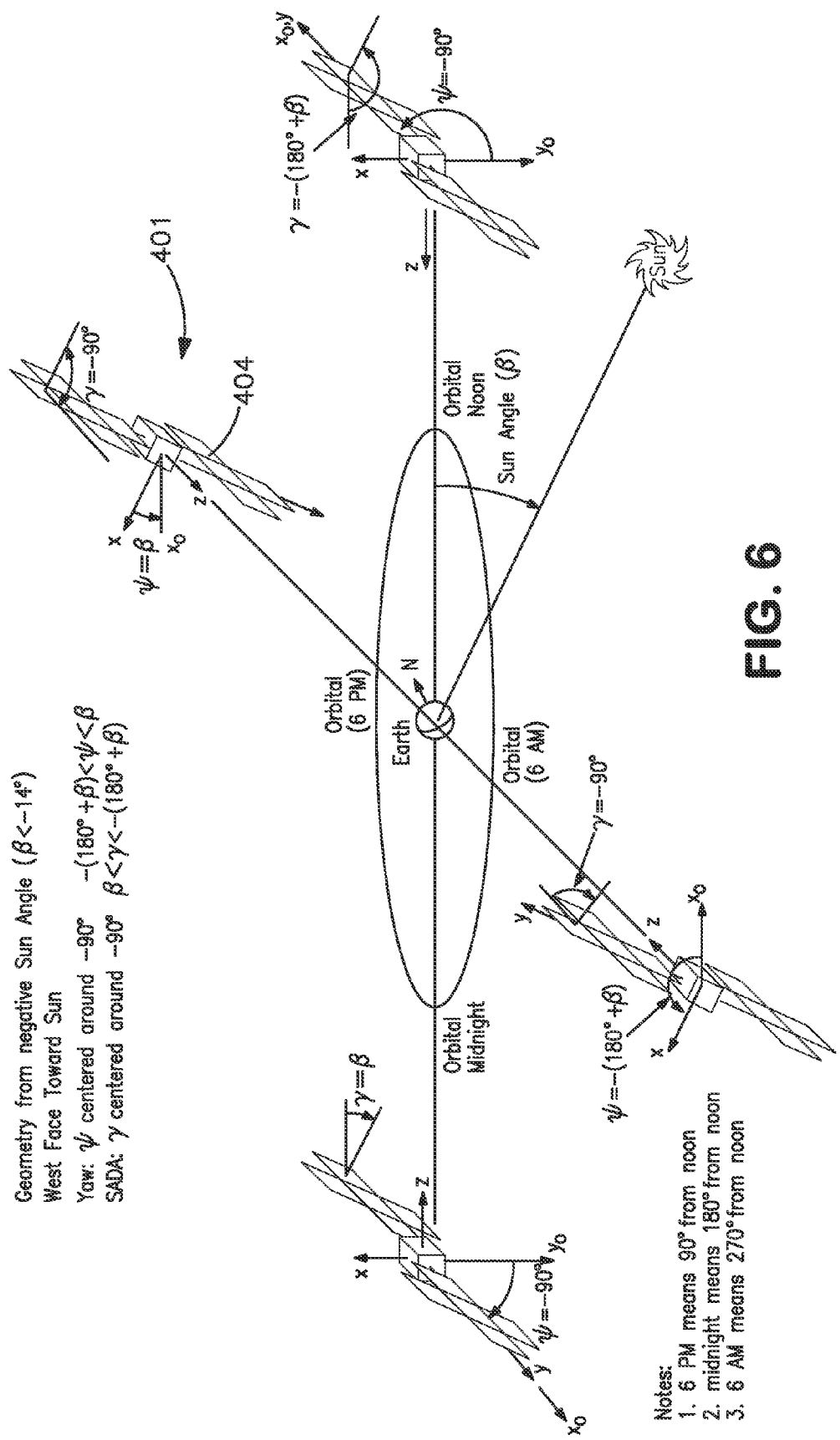
FIG. 6 illustrates yaw steering.

Due to the Earth's axial tilt with respect to its orbit about the sun, a sun angle relative to the spacecraft's orbit plane (the "beta angle") varies with time of year. As illustrated in FIG. 6, when the beta angle is large, spacecraft 401 may advantageously be rotated around its yaw (Z) axis to maintain solar arrays 404 more nearly perpendicular to the sun, a procedure called 'yaw-steering'. When the beta angle is small, spacecraft 401 follows an orbit-normal profile, wherein solar arrays 404 are orthogonal to the orbit plane. Active steering of spacecraft bus 403 resulting from a combination of payload-steering and yaw-steering will be referred to as 'body-steering'.

Figure 5:
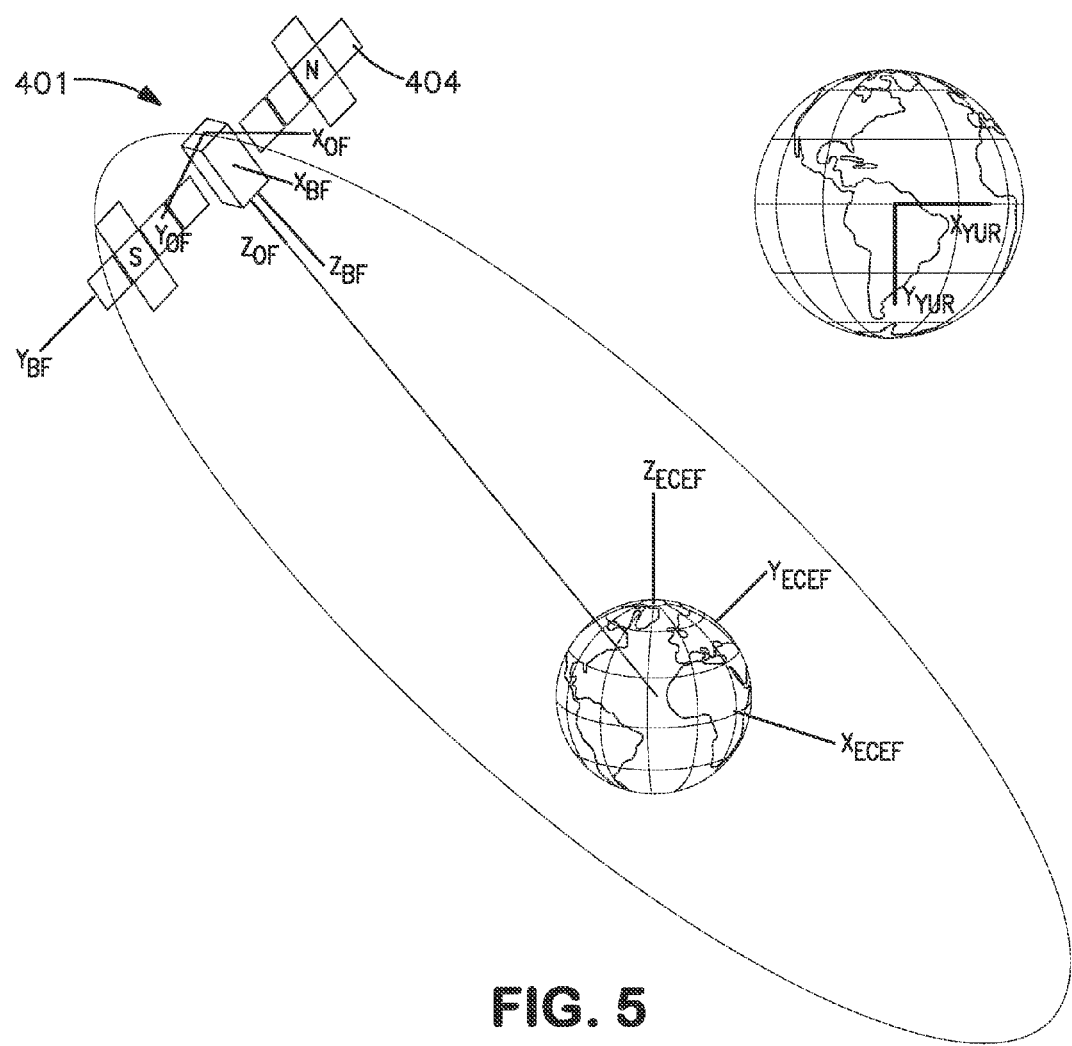
FIG. 5 illustrates coordinate systems defined for use in an embodiment.

Body steering may be described mathematically with respect to various coordinate systems, illustrated in FIG. 5.

By convention, the three axes of a spacecraft coordinate frames are denominated the roll (X), pitch (Y), and yaw (Z) axes. Thus, the orientation of spacecraft 401 with respect to orbital references ("orbit frame", or "OF") as illustrated in FIG. 5 may be defined as follows: yaw axis $Z_{OF}$ is a vector from a spacecraft coordinate frame origin of spacecraft 401 to the center of the Earth; roll axis $X_{OF}$ is orthogonal to $Z_{OF}$ and lies in the orbital plane, substantially coincident with the spacecraft velocity vector; and pitch axis $Y_{OF}$ completes a right hand coordinate frame.

It is convenient to distinguish between a coordinate frame defined in terms of the spacecraft body (hereinafter "body frame" or "BF") from coordinate frames defined in terms of orbital or geocentric references. Thus, as illustrated in FIG. 5, the BF coordinate frame provides a positive pitch axis $Y_{BF}$ defined by a longitudinal axis of south solar array 404; a yaw axis $Z_{BF}$ is substantially coincident with a line from the spacecraft coordinate frame origin perpendicular to $Y_{BF}$, and parallel to $Z_{reflector}$, and a roll axis $X_{BF}$ completing the right hand coordinate frame.

FIG. 5 also illustrates that location of spacecraft 401 may be defined in terms of an "Earth centered, Earth fixed" (ECEF) coordinate system. In the ECEF coordinate system, a Z axis is aligned to the spin axis of the earth, an X axis projects from the Earth's center through a point on the Earth's surface at zero longitude/zero latitude, and a Y axis completes a right hand co-ordinate system. It will be understood that the ECEF coordinate system moves with respect to the sun as a complex function of the Earth's rotation about the sun, as well as nutation and precession of the Earth's axis of rotation.

Finally, a coordinate system, termed the "yaw-up-right" ("YUR") coordinate system, is defined with respect to the ECEF system as also illustrated in FIG. 5. The YUR is defined as having $Z_{YUR}$ extending from spacecraft 401 to the center of the Earth, $X_{YUR}$ orthogonal to $Z_{YUR}$ and parallel to the Earth's equatorial plane, and $Y_{YUR}$ completing the right hand coordinate system.

As stated above, with reference to FIG. 4, the boresight of the antenna reflector ($Z_{reflector}$) may advantageously be actively steered so as to point to a time varying target on the ground. To fully describe a preferred steering profile, two additional reference frames, the reflector frame and the payload frame, are defined with respect to $Z_{reflector}$.

The reflector frame is attached to the reflector. By definition, the $Z_{reflector}$ and the spacecraft body z-axis are parallel. In the reflector frame, as illustrated in FIG. 4, the $X_{reflector}$ and $Y_{relfector}$ axes are also defined to be parallel, respectively, to the spacecraft body $X_{bf}$ and $Y_{bf}$ axes, but the origins of the two frames are separate.

A coverage area illuminated by reflector 402 is not necessarily circular. Instead, the coverage area may be shaped for more optimal coverage of an intended service area. As described hereinabove, spacecraft 401 may undergo yaw steering. Thus, to retain the antenna pattern emanating from reflector 402 in a desired orientation (i.e., at some optimal yaw-angle) it may be advantageous to counter steer, for example, sub-reflector 405. Accordingly, it is convenient to define a payload frame coordinate system where $Z_{PL}$ is aligned with $Z_{reflector}$, but $X_{PL}$ and $Y_{PL}$ are offset by a rotation angle of the sub-reflector. When the sub-reflector angle is zero, $X_{PL}$ and $Y_{PL}$ are coincidental with $X_{reflector}$ and $Y_{reflector}$.

A method for payload orientation steering of spacecraft 401 whereby a payload of spacecraft 401 is substantially aligned with a moving optimal payload target as spacecraft 401 moves along orbit track 310 will now be described. As noted above, this target location (Z-axis aim track 102) may have a substantial motion with respect to the Earth's surface and with respect to spacecraft nadir.

In a first step, an actual orbit position of spacecraft 401 is determined. Advantageously, the actual orbit position may be determined using a numerical dynamic orbit propagator (DOP) that accurately describes the orbital position of the spacecraft given an initial orbit. The DOP may output a DOP state vector defining the location of spacecraft 401 in an inertial frame of reference. The DOP may minimize error between the predicted orbit position and the actual orbit position by performing orbit propagation taking into account orbit disturbances resulting from thruster firings associated with, for example, stationkeeping and attitude control procedures.

In a second step, the predicted orbit position outputted by the DOP may be used to compute the desired inertial attitude of the spacecraft. Advantageously, a low rate products (LRP) block may process inputs from the DOP to compute an ideal quaternion co-ordinate transformation from the orbit frame (OF) to the body frame (BF), denoted $_{OF}QT_{BF}$. This quaternion may represent an ideal body attitude relative to the OF during, for example, yaw-steering season, or orbit normal season. The computations may be performed in the following order:

First, using the DOP state vector defining the spacecraft location in the TOD frame of reference, a coordinate transformation from OF to the YUR frame, denoted $_{OF}T_{YUR}$, may be computed.

Second, a rotation matrix from the YUR frame to the payload frame may be computed as $$_{YUR}R_{PL} = R(\psi_{FIT}) \cdot R(\theta_{FIT}) \cdot R(\phi_{FIT})$$

where, R is a rotation matrix, and $\Phi_{FIT}$, $\theta_{FIT}$, and $\Psi_{FIT}$ are fitted expressions related to payload optimized roll, pitch, and yaw angles obtained by a mathematical process described hereinbelow. For example, the roll ($\Phi_{FIT}$) and pitch ($\theta_{FIT}$) angles may be modeled with fitted multidimensional high order polynomial functions, while the yaw ($\Psi_{FIT}$) angle may be fitted with an $m_{th}$ order Fourier series. The payload-optimized roll, pitch and yaw angles may be computed based on payload performance objectives and parameterized as a function of the spacecraft longitude, latitude and radius. Advantageously, each rotation matrix defines a sequence of 1-2-3 'space-fixed' Euler rotation, where each subsequent rotation is performed about the original 'un-rotated' axis.

Coordinate transformation from the orbit frame to the payload frame may be determined according to the following expression:

$$_{OF}T_{PL} = {}_{YUR}T_{PL} \cdot {}_{OF}T_{YUR}.$$

Then, a co-ordinate transformation from the payload frame to the body frame, denoted $_{PL}T_{BF}$, may be computed. In some cases, the payload frame and the body frame may be defined to have an identical z-axis. As a result, determination of $_{OF}T_{PL}$ also results in determination of the z-axis of the body frame, denoted $Z_{BF}$. Determination of the other two axes of the reflector frame must take into account whether or not the spacecraft is operating in yaw-steering mode.

When the spacecraft is operating in yaw-steering mode, the sun vector is nominally orthogonal to the axis of rotation of the solar arrays, denoted $Y_{BF}$. The x-axis of the reflector frame, denoted $X_{BF}$, may then be determined by completing the right-hand co-ordinate system. When the spacecraft is not operating in yaw steering mode, $X_{BF}$ is in the orbit plane, and $Y_{BF}$ may be computed by completing the right-hand co-ordinate system.

Finally, the orientation of the body relative to the orbit frame may be computed as $$_{OF}T_{BF} = {_{PL}}T_{BF} \cdot {_{OF}}T_{PL}.$$

It is not necessary that the spacecraft co-ordinate frame and the reflector co-ordinate be parallel, hence the above mentioned technique may be modified to incorporate the misalignment, unintended or deliberate, between the spacecraft body and the reflector.

As described hereinabove, $\Phi_{FIT}$, $\theta_{FIT}$, and $\Psi_{FIT}$ may be fitted expressions related to payload optimized roll, pitch, and yaw angles. More particularly, referring now to FIG. 7, $\Phi_{FIT}$ and $\theta_{FIT}$ may each be advantageously expressed as a sum of (1) a respective function that computes the angle to a fixed fit-target 701 via analytical geometry and (2) a respective multidimensional high order polynomial function modeling a fitted profile "away" from fit-target 701. $\Psi_{FIT}$ may be advantageously expressed as a sum of (1) a function that computes the angle to a chosen target via analytical geometry and (2) a respective $m_{th}$ order Fourier series modeling a fitted profile "away" from the fit-target:

$$\begin{bmatrix} \phi_{fit} \\ \theta_{fit} \\ \psi_{fit} \end{bmatrix} = \begin{bmatrix} f_\phi(\lambda_{trg}, \mu_{trg}, r_{trg}, \lambda^t_{s/c}, \mu^t_{s/c}, r^t_{s/c}) + f_{\phi,poly}(\lambda^t_{s/c}, \mu^t_{s/c}, r^t_{s/c}) + \phi_{offset} \\ f_\theta(\lambda_{trg}, \mu_{trg}, r_{trg}, \lambda^t_{s/c}, \mu^t_{s/c}, r^t_{s/c}) + f_{\theta,poly}(\lambda^t_{s/c}, \mu^t_{s/c}, r^t_{s/c}) + \theta_{offset} \\ f_\psi(\lambda_{trg}, \mu_{trg}, r_{trg}, \lambda^t_{s/c}, \mu^t_{s/c}, r^t_{s/c}) + f_{\psi,fourier}(U^t_{o_{s/c}}) + \psi_{offset} \end{bmatrix}$$

where, $f_\phi$, $f_\theta$, and $f_\psi$ are functions that compute the angles to a chosen target via analytical geometry; $f_{\phi,poly}$, $f_{\theta,poly}$ and $f_{y,Fourier}$ are polynomial and Fourier series evaluations of the fitted profiles 'away' from the target; $\Psi_{Offset}$, $\theta_{Offset}$, and $\Phi_{Offset}$ are commandable offsets; $\lambda_{trg}$, $\mu_{trg}$ and $r_{trg}$ are the commandable target geocentric longitude, latitude and radius; $\lambda^t_{s/c}$, $\mu^t_{s/c}$, $r^t_{s/c}$, and $U_o$ are the instantaneous s geocentric longitude, latitude, radius, and argument of latitude (which may be obtained from the DOP).

Figure 7:
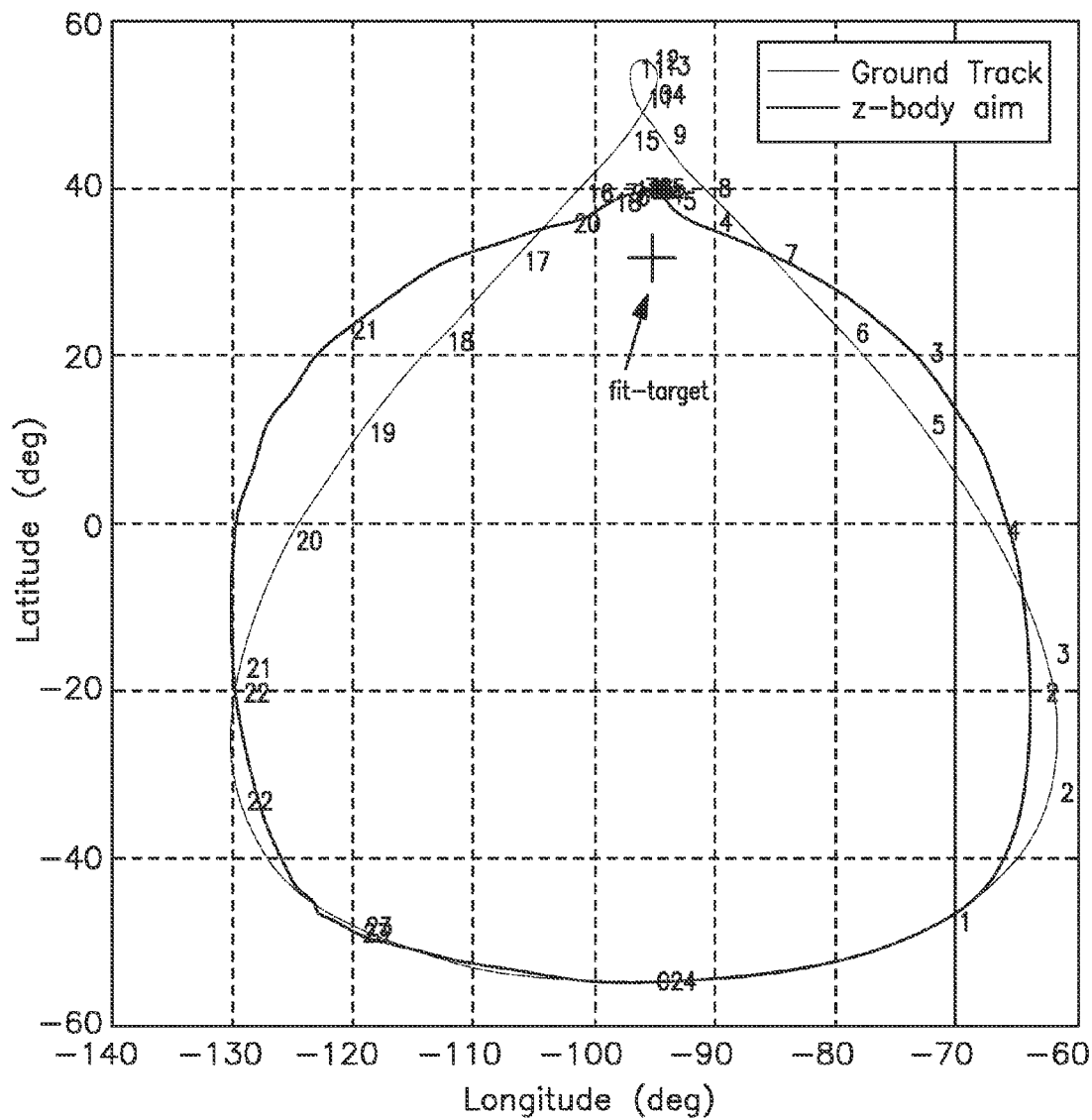
FIG. 7 illustrates a ground track and a track of an optimal target aim point.
Figure 8A:
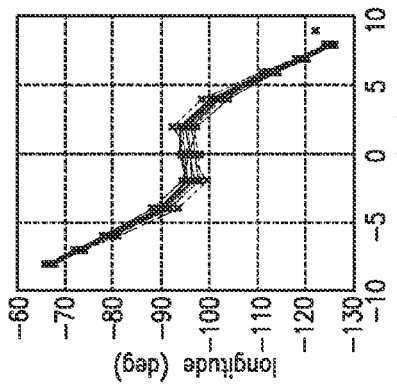
FIG. 8 illustrates s/c position and body steering rotations as a function of time in orbit measured from apogee.
Figure 8B:
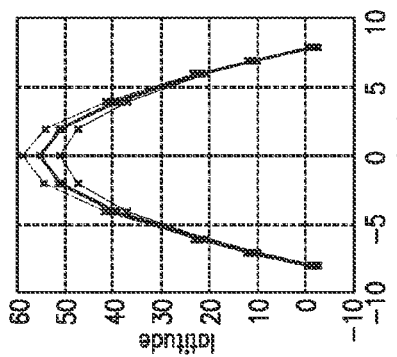
Figure 8C:
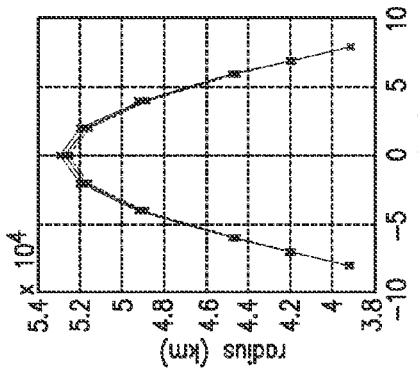
Figure 8D:
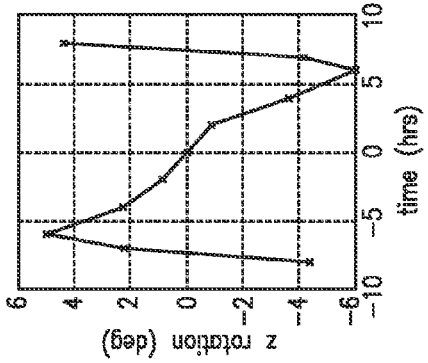
Figure 8E:
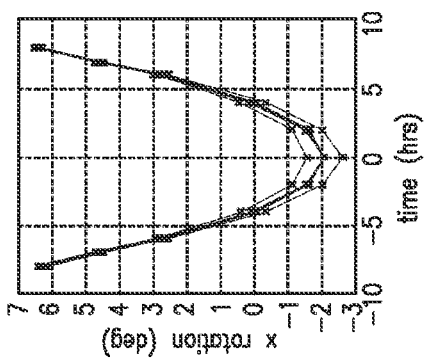
Figure 8F:
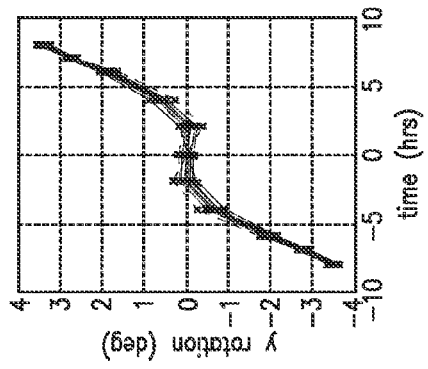

FIG. 7 illustrates an exemplary S/C ground track 701 overlaid with Z axis aim point 702 where $\Phi_{FIT}$, $\theta_{FIT}$, and $\Psi_{FIT}$ are set to keep the payload pointed over the intended service area (in this example, the continent of the US) for an extended portion of the orbital period (approximately sixteen hours). In an embodiment, a manual command may be provided to turn off the entire fitted profile, thus effectively setting $\Phi_{FIT}$, $\theta_{FIT}$, and $\Psi_{FIT}$ to zero. Then, the spacecraft Z axis will be continuously directed to the spacecraft nadir in which case ground track 701 and z-body aim point 702 would be identical.

In a further embodiment, a command may be provided to turn off the fit function $f_{\phi,poly}$, $f_{\theta,poly}$, and $f_{y,Fourier}$, and the commandable offsets $\Psi_{Offset}$, $\theta_{Offset}$, and $\Phi_{Offset}$, thus causing the spacecraft Z axis to be continuously directed to fit-target 701 (when fit-target 701 is within line of sight of spacecraft 401).

In an exemplary embodiment, $f_{\phi,poly}$ and $f_{\theta,poly}$ may be described by multidimensional, fifth order polynomials and $\theta_{y,Fourier}$ may be describe by an eighth order Fourier series.

As illustrated in FIG. 8, the exemplary embodiment satisfactorily aligns the actual payload Z axis aim point with the desired target over a range of orbital conditions. For example, the inventors analyzed the actual payload Z axis aim point vs time for a nominal orbit (inclination: 55 degrees; eccentricity: 0.25; argument of perigee: 270 degrees; apogee longitude: –96 degrees) and for off-nominal orbits (inclination from 51 to 59 degrees; eccentricity from 0.245 to 0.255; argument of perigee from 269 to 271 degrees; apogee longitude from –95 to –97 degrees). FIGS. 8a, 8b, and 8c illustrate the spacecraft coordinates of, respectively, longitude, latitude, and radius as a function of time for a sheaf of the aforementioned nine nominal and off-nominal orbits. FIGS. 8d, 8e, and 8f illustrate, respectively the target optimal z, x, and y axis rotations from the YUR frame to the payload frame.

Thus, a method to parameterize the payload pointing direction that optimizes EIRP to an intended service area as a function of the spacecraft instantaneous position as estimated by the onboard orbit propagator processor has been disclosed. The foregoing method may be accomplished using appropriate apparati and systems. For example, a system embodiment may include an orbit propagator processor configured to determine coordinates of an optimal payload target location as a function of a spacecraft position along an orbit track, and a spacecraft on-board attitude control system configured to substantially align a payload of the spacecraft with the determined coordinates by adjusting the spacecraft orientation as a function of the spacecraft position along the orbit track. The orbit propagator processor may be located onboard the spacecraft or be communicatively coupled thereto from a location on the ground.

Using the teachings of the present disclosure, substantial improvements to the EIRP delivered to the intended service area are achieved.

The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A method comprising:
    determining, as a function of a position of a spacecraft along an orbit track around a celestial body, time varying coordinates of a non-fixed target location, the non-fixed target location having a substantial motion with respect to a fixed fit-target on a surface of the celestial body and with respect to a spacecraft nadir, said orbit track having one or both of (i) an eccentricity of at least 0.2, and (ii) an inclination with respect to an equatorial orbit of at least 50 degrees; and
    substantially aligning an antenna reflector of the spacecraft with the determined time varying coordinates by actively steering the spacecraft orientation as a function of the position of the spacecraft along the orbit track such that a boresight of the antenna reflector points to the determined time varying coordinates, wherein actively steering the spacecraft orientation includes:
        determining an actual orbit position of the spacecraft;
        computing, for the determined actual orbit position, a desired inertial attitude of the spacecraft in terms of fitted expressions related to payload optimized roll angle, $\Phi_{FIT}$, pitch angle, $\theta_{FIT}$, and yaw angle, $\Psi_{FIT}$, wherein
        one or more of $\Phi_{FIT}$, $\theta_{FIT}$, and $\Psi_{FIT}$ are expressed as a sum of a first function that computes a steering angle to the fixed fit-target and a respective second or third function modeling a fitted profile away from the fit-target.

2. The method of claim 1, wherein
the first function computes the angle to the fixed fit-target via analytical geometry;
the second function is a multidimensional high order polynomial function modeling a fitted profile away from the fit-target; and
the third function is an $m_{th}$ order Fourier series modeling a fitted profile away from the fit-target.

3. The method of claim 1, wherein the orbit track has an eccentricity of at least 0.24, and an inclination with respect to the equatorial orbit of at least 50 degrees.

4. The method of claim 3, wherein an orbital inclination is permitted to drift over time.

5. The method of claim 1, wherein determining the coordinates is adapted to optimize EIRP.

6. The method of claim 1, wherein the spacecraft is steered in yaw.

7. The method of claim 1, wherein determining the coordinates of the target location is autonomously performed by logic embedded in a control electronics module of the spacecraft.

8. The method of claim 7, wherein any drift in the orbit is automatically predicted by an on-board orbit propagator processor embedded in the control electronics module of the spacecraft.

9. The method of claim 1, wherein the target location is computed using a multidimensional polynomial of Nth order, parameterized by the spacecraft position, describing at least one of a roll, pitch, and yaw rotation away from a predetermined fixed target location, with N being greater than or equal to 1.

10. The method of claim 1, wherein the target location is computed using an Mth order Fourier series, parameterized by the spacecraft position, describing at least one of a roll, pitch, and yaw rotation away from a predetermined fixed target location, with M being greater than or equal to 1.

11. The method of claim 1, wherein Euler angles are used to represent subsequent angular rotations.

12. The method of claim 1, wherein quaternions are used to represent the required angular rotations and reference frames.

13. A system for spacecraft payload orientation steering, said system comprising:
an orbit propagator processor configured to determine, as a function of a position of a spacecraft along an orbit track around a celestial body, time varying coordinates of a non-fixed target location, the non-fixed target location having a substantial motion with respect to a fixed fit-target on a surface of the celestial body and with respect to a spacecraft nadir, said orbit track having one or both of (i) an eccentricity of at least 0.2 and (ii) an inclination with respect to an equatorial orbit of at least 50 degrees; and
an attitude control subsystem programmed to substantially align an antenna reflector of the spacecraft with the determined time varying coordinates by actively steering the spacecraft orientation as a function of the position of the spacecraft along the orbit track such that a boresight of the antenna reflector points to the determined time varying coordinates, wherein actively steering the spacecraft orientation includes:
determining an actual orbit position of the spacecraft;
computing, for the determined actual orbit position, a desired inertial attitude of the spacecraft in terms of fitted expressions related to payload optimized roll angle, $\Phi_{FIT}$, pitch angle, $\Theta_{FIT}$, and yaw angle, $\Psi_{FIT}$, wherein one or more of $\Phi_{FIT}$, $\Theta_{FIT}$ and $\Psi_{FIT}$ are expressed as a sum of a first function that computes a steering angle to the fixed fit-target and a respective second or third function modeling a fitted profile away from the fit-target.

14. The system of claim 13, wherein:
the first function computes the angle to the fixed fit-target via analytical geometry;
the second function is a multidimensional high order polynomial function modeling a fitted profile away from the fit-target; and
the third function is an $m_{th}$ order Fourier series modeling a fitted profile away from the fit-target.

15. The system of claim 13, wherein the orbit track has an eccentricity of at least 0.24, and an inclination with respect to the equatorial orbit of at least 50 degrees.

16. The system of claim 15, wherein an orbital inclination is permitted to drift over time.

17. The system of claim 13, wherein determining the coordinates is adapted to optimize EIRP.

18. The system of claim 13, wherein the spacecraft is steered in yaw.

19. The system of claim 13, wherein determining the coordinates of the target location is autonomously performed by logic embedded in a control electronics module of the spacecraft.

20. The system of claim 19, wherein any drift in the orbit is automatically predicted by an on-board orbit propagator processor embedded in the control electronics module of the spacecraft.

21. The system of claim 13, wherein the target location is computed using a multidimensional polynomial of Nth order, parameterized by the spacecraft position, describing at least one of a roll, pitch, and yaw rotation away from a predetermined fixed target location, with N being greater than or equal to 1.

22. The system of claim 13, wherein the target location is computed using an Mth order Fourier series, parameterized by the spacecraft position, describing at least one of a roll, pitch, and yaw rotation away from a predetermined fixed target location, with M being greater than or equal to 1.

23. The system of claim 13, wherein Euler angles are used to represent subsequent angular rotations.

24. The system of claim 13, wherein quaternions are used to represent the required angular rotations and reference frames.

* * * * *